United States Patent
Mancuso, Jr.

(10) Patent No.: US 9,380,771 B1
(45) Date of Patent: Jul. 5, 2016

(54) BUCKET STABILIZING SYSTEM COVER

(71) Applicant: Robert Mancuso, Jr., Clio, AL (US)

(72) Inventor: Robert Mancuso, Jr., Clio, AL (US)

( * ) Notice: Subject to any disclaimer, the term of this patent is extended or adjusted under 35 U.S.C. 154(b) by 0 days.

(21) Appl. No.: 14/332,044

(22) Filed: Jul. 15, 2014

(51) Int. Cl.
| | |
|---|---|
| *A01K 97/06* | (2006.01) |
| *B65D 25/24* | (2006.01) |
| *B65D 90/12* | (2006.01) |
| *A01K 97/20* | (2006.01) |
| *A01K 97/05* | (2006.01) |
| *A01K 97/22* | (2006.01) |
| *B44D 3/14* | (2006.01) |

(52) U.S. Cl.
CPC .......... *A01K 97/06* (2013.01); *A01K 97/05* (2013.01); *A01K 97/20* (2013.01); *A01K 97/22* (2013.01); *B44D 3/14* (2013.01); *B65D 25/24* (2013.01); *B65D 90/125* (2013.01)

(58) Field of Classification Search
CPC ....... A01K 97/20; A01K 97/05; A01K 97/06; A01K 97/22; B44D 3/14
USPC ................ 248/346.5, 146, 154, 500
See application file for complete search history.

(56) References Cited

U.S. PATENT DOCUMENTS

| | | | | |
|---|---|---|---|---|
| 1,841,956 | A * | 1/1932 | Juergens | 43/55 |
| 2,545,320 | A | 3/1951 | Tilson et al. | |
| 2,734,305 | A * | 2/1956 | Hannah | 43/56 |
| 2,790,266 | A * | 4/1957 | Williamson | 43/55 |
| 2,810,235 | A * | 10/1957 | Magid | 47/81 |
| 3,028,702 | A | 4/1962 | St Cyr | |
| 3,381,408 | A * | 5/1968 | Nishimura | 43/55 |
| 3,559,329 | A * | 2/1971 | Chiu | 43/55 |
| 3,757,990 | A * | 9/1973 | Buth | 220/570 |
| 3,784,136 | A * | 1/1974 | Lopez | 47/40.5 |
| 4,083,146 | A * | 4/1978 | Brankovic | 47/71 |
| 4,084,701 | A | 4/1978 | White | |
| 4,261,138 | A * | 4/1981 | St. George Syms | 47/40.5 |
| D260,278 | S | 8/1981 | Bradford | |
| 4,339,891 | A * | 7/1982 | Bassett | 47/71 |
| 4,369,598 | A * | 1/1983 | Beckwith | 47/61 |
| D269,571 | S | 7/1983 | Geshwind | |
| 4,581,277 | A * | 4/1986 | Neale | 428/181 |
| 4,606,143 | A * | 8/1986 | Murphy, Jr. | 43/56 |
| 4,763,438 | A * | 8/1988 | Saliaris | 43/56 |
| 4,787,169 | A * | 11/1988 | Maxfield et al. | 43/57 |
| 4,826,007 | A | 5/1989 | Skeie | |
| 4,884,363 | A * | 12/1989 | Sofy | 47/40.5 |
| 4,905,404 | A * | 3/1990 | Pasion et al. | 43/55 |
| 4,905,945 | A | 3/1990 | Peterson | |
| 4,907,712 | A | 3/1990 | Stempin | |
| 4,932,621 | A | 6/1990 | Kowk | |
| 5,046,749 | A * | 9/1991 | Owens | 280/79.5 |
| 5,125,184 | A | 6/1992 | Anderson | |
| 5,319,877 | A * | 6/1994 | Hagan | 43/54.1 |
| D364,831 | S | 12/1995 | Fillipp | |
| 5,551,659 | A * | 9/1996 | Sofy | 248/523 |
| 5,593,743 | A * | 1/1997 | Baker | 428/18 |
| D383,271 | S | 9/1997 | Eshelman | |
| 5,661,924 | A * | 9/1997 | Maxwell | 43/55 |
| 5,711,106 | A * | 1/1998 | Ellis | 47/32 |
| 5,727,708 | A * | 3/1998 | Erickson | 220/23.87 |
| 5,743,505 | A | 4/1998 | Sofy | |
| 5,782,453 | A * | 7/1998 | Tuzza et al. | 248/523 |

(Continued)

*Primary Examiner* — Eret Monichols

(57) ABSTRACT

A bucket stabilizing system cover for covering a bucket stabilizing system features a cover having an annular top cover surface, a tapered cover side wall, an open cover bottom, and at least one cover slot located in a cover side wall. The cover is placed over a base of the bucket stabilizing system.

1 Claim, 6 Drawing Sheets

(56) References Cited

U.S. PATENT DOCUMENTS

| | | | |
|---|---|---|---|
| 5,845,890 A | 12/1998 | Earsley et al. | |
| 5,893,547 A * | 4/1999 | Cohen, Jr. | 248/521 |
| 6,023,882 A * | 2/2000 | Heinrich | 47/40.5 |
| 6,286,804 B1 | 9/2001 | Avinger et al. | |
| 6,361,001 B1 | 3/2002 | Durand | |
| D462,558 S * | 9/2002 | Friedman | D6/610 |
| 6,464,184 B1 | 10/2002 | Lytle | |
| 7,018,090 B2 | 3/2006 | Moore | |
| D523,518 S | 6/2006 | Moldenhauer | |
| 7,080,484 B2 * | 7/2006 | Littge | 47/79 |
| 7,131,621 B2 * | 11/2006 | Welzen | 248/514 |
| 7,249,435 B1 * | 7/2007 | Tetenes | 43/44.99 |
| 7,258,312 B2 | 8/2007 | Grosse | |
| D575,581 S | 8/2008 | Harris | |
| D579,514 S | 10/2008 | Kelps | |
| 7,494,103 B1 | 2/2009 | Huebner | |
| D593,270 S | 5/2009 | Taylor | |
| D593,364 S | 6/2009 | Harris | |
| 7,556,230 B2 | 7/2009 | Sarullo | |
| 7,597,304 B1 * | 10/2009 | Gray | 248/523 |
| 7,644,819 B2 | 1/2010 | Gill et al. | |
| 7,708,242 B1 | 5/2010 | Petrashune et al. | |
| 7,726,621 B1 * | 6/2010 | Dellinger | 248/346.5 |
| 7,775,360 B2 * | 8/2010 | Bornemeier et al. | 206/423 |
| D630,704 S | 1/2011 | Kochanski | |
| D636,944 S | 4/2011 | Anderson et al. | |
| D641,064 S | 7/2011 | Cogswell et al. | |
| D648,904 S | 11/2011 | Tedaldi et al. | |
| 8,091,853 B2 | 1/2012 | Clores | |
| D658,267 S | 4/2012 | Brockington et al. | |
| 8,215,517 B2 | 7/2012 | Chohfi et al. | |
| D676,353 S | 2/2013 | Bycraft | |
| D677,128 S | 3/2013 | Roesser | |
| 8,534,632 B1 | 9/2013 | Mancuso | |
| 8,733,580 B1 * | 5/2014 | Schall, Jr. | 220/570 |
| 8,756,856 B1 * | 6/2014 | Girvin | 43/55 |
| 8,887,940 B2 * | 11/2014 | Kiceniuk et al. | 220/495.02 |
| 2002/0017049 A1 * | 2/2002 | Millett et al. | 43/11 |
| 2004/0016855 A1 | 1/2004 | Berry et al. | |
| 2005/0045780 A1 | 3/2005 | Forshee et al. | |
| 2005/0152140 A1 * | 7/2005 | Frederick | 362/235 |
| 2005/0166448 A1 | 8/2005 | Liu | 47/32 |
| 2006/0091275 A1 * | 5/2006 | Roberts | 248/311.2 |
| 2006/0255230 A1 * | 11/2006 | Bornemeier et al. | 248/519 |
| 2007/0076519 A1 | 4/2007 | Kesling | |
| 2007/0187564 A1 | 8/2007 | McGuire | |
| 2007/0252051 A1 | 11/2007 | Kuipers | |
| 2008/0042035 A1 | 2/2008 | Elwood | |
| 2008/0250697 A1 * | 10/2008 | Wasnick | 43/56 |
| 2008/0307693 A1 * | 12/2008 | Wessels | 43/55 |
| 2009/0064565 A1 * | 3/2009 | Sloop | 43/57 |
| 2009/0126641 A1 | 5/2009 | Anderson et al. | |
| 2010/0077963 A1 | 4/2010 | Lipscomb et al. | |
| 2011/0140412 A1 | 6/2011 | Manser et al. | |
| 2013/0235563 A1 * | 9/2013 | Roos | 362/122 |
| 2014/0260107 A1 * | 9/2014 | Conti et al. | 53/461 |
| 2015/0366389 A1 * | 12/2015 | Parsons et al. | |

* cited by examiner (Prior Art)
Mancuso
U.S. Patent No. 8,534,632

BUCKET STABILIZING SYSTEM COVER

FIELD OF THE INVENTION

The present invention relates to bucket stabilizing system covers.

BACKGROUND OF THE INVENTION

Sometimes, while using a bucket, the bucket can be tipped over, spilling the contents. Typically, this is due to the shape of the bucket, which is usually cylindrical or conical, tapering from the top to the bottom. A bucket stabilizing system for stabilizing a bucket can help with tipping as well as provide a covered storage space. A bucket stabilizing system cover can ensure that the contents within the storage space are fully protected while providing a versatile tray when positioned upside down.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims

SUMMARY OF THE INVENTION

The present invention features a bucket stabilizing system cover for covering a bucket stabilizing system. In some embodiments, the cover comprises an annular cover top surface. In some embodiments, the cover comprises a tapered cover side wall. In some embodiments, the cover comprises an open cover bottom.

In some embodiments, at least one cover slot is located in the cover side wall. In some embodiments, the cover is alternately located over a base covering a base access hole and is removed to access the base access hole. In some embodiments, an inside of the cover side wall interfaces with an outside of a base side wall. In some embodiments, the cover is located having the annular cover top surface placed on a horizontal surface having an interior cavity of the cover used as a top tray or a bowl.

DESCRIPTION OF PREFERRED EMBODIMENTS

Figure 1:
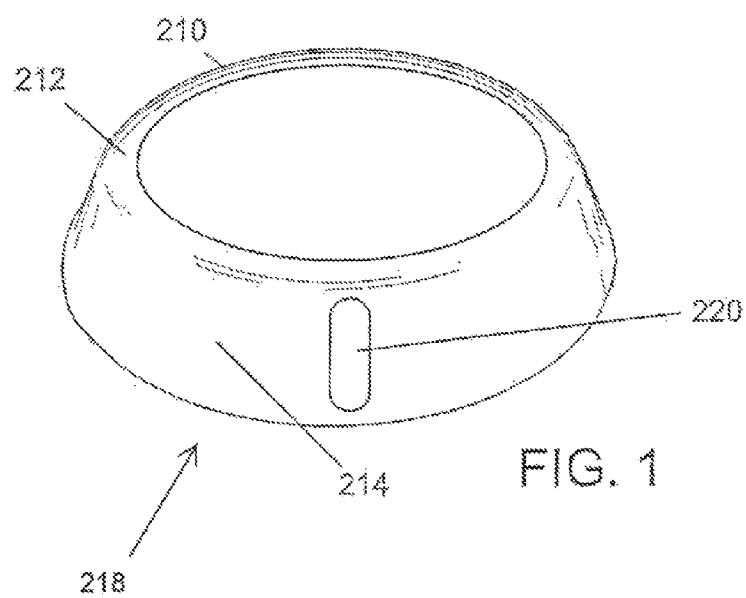
FIG. 1 shows a perspective view of the cover of the present invention. In some embodiments, the cover is a circular lid.
Figure 2:
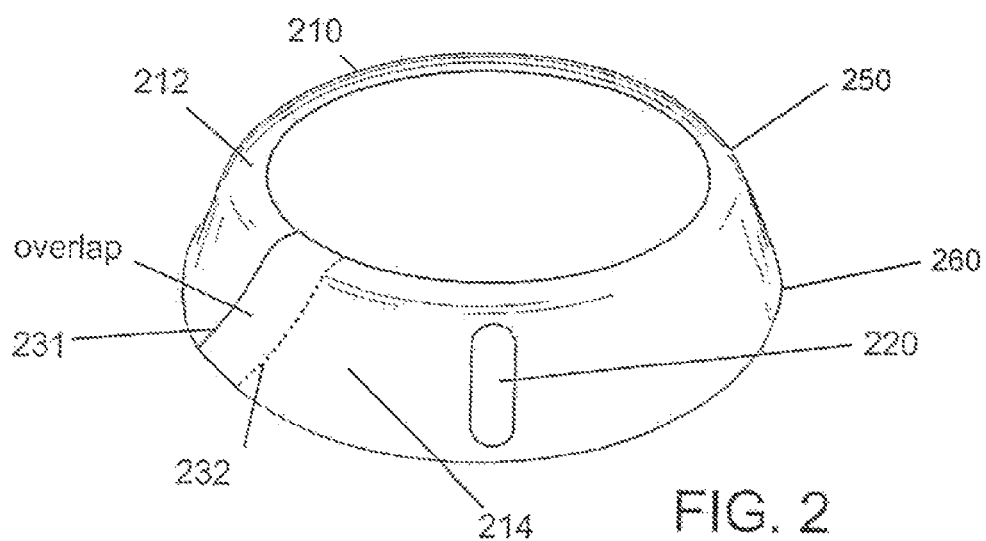
FIG. 2 shows a perspective view of an alternate embodiment of the cover of the present invention. In some embodiments, the cover is an overlapping lid.
Figure 3:
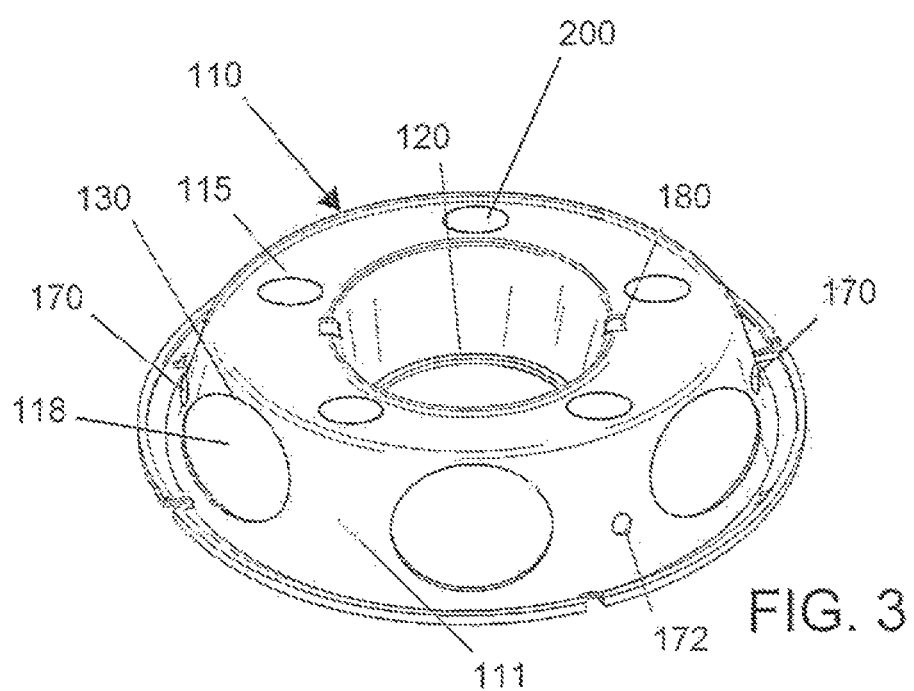
FIG. 3 shows a perspective view of the base before applying the cover of the present invention. In some embodiments, the base unit has top holes and is shown with no cover lid.
Figure 4:
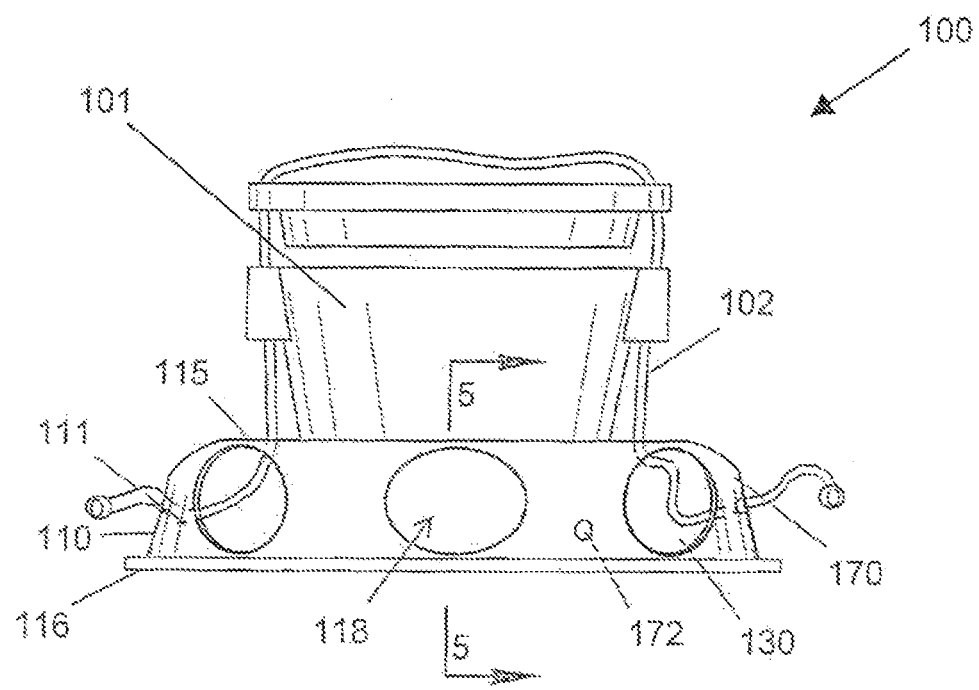
FIG. 4 shows a side view of a base and a bucket before applying the cover of the present invention.
Figure 5:
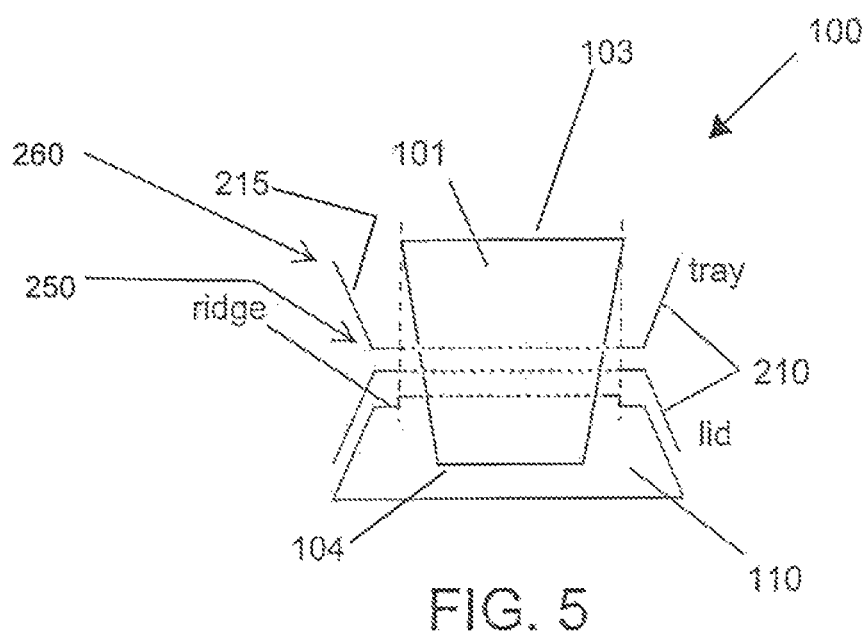
FIG. 5 shows a schematic view of the cover of the present invention fitting on the base of the present invention as a lid and alternately setting on the base of the present invention as a tray. In some embodiments, the inner opening of the lid must be large enough to fit over the diameter of the top of the bucket.
Figure 6A:
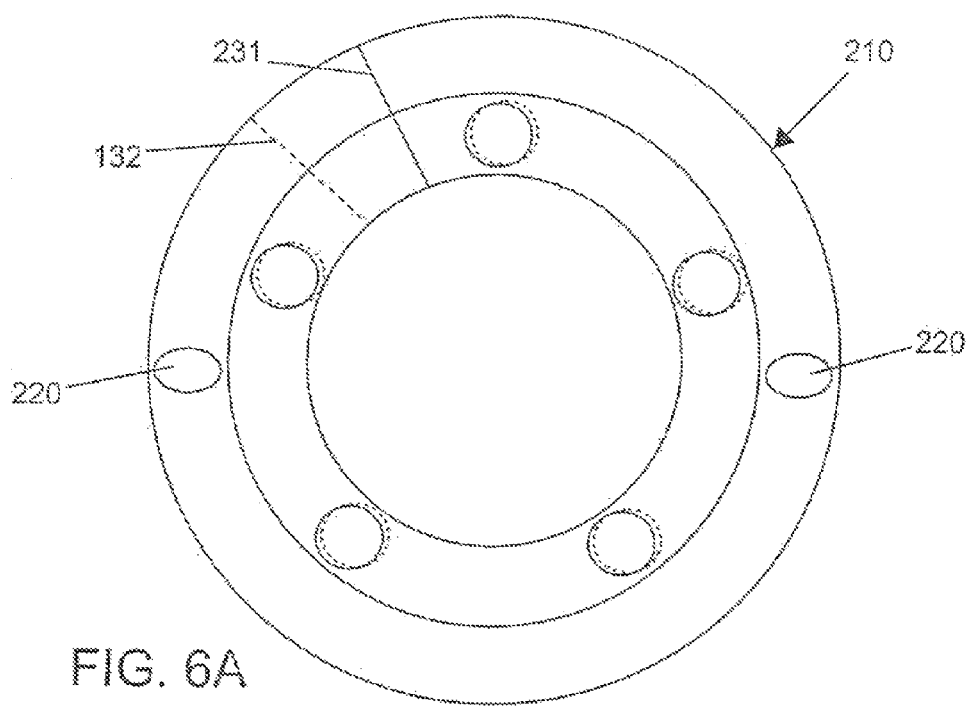
FIG. 6A shows a top view of the cover of the present invention having the tool apertures aligned with the base.
Figure 6B:
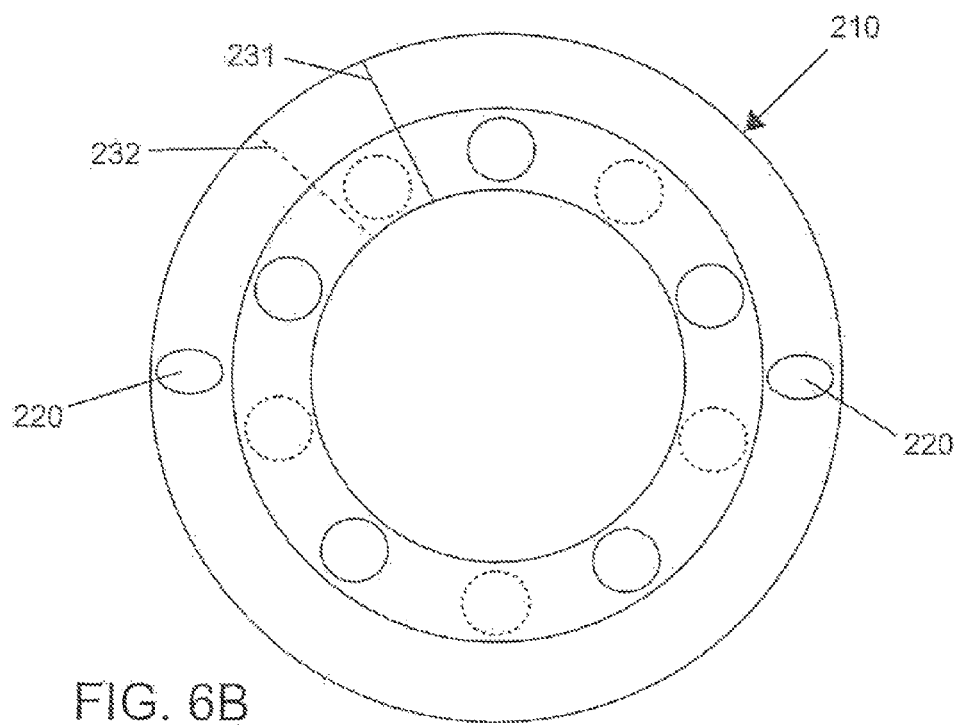
FIG. 6B shows a top view of the cover of the present invention having the tool apertures not aligned with the base

Following is a list of elements corresponding to a particular element referred to herein:
100 Bucket stabilizing system
101 Bucket
102 Rope
110 Base
111 Base side wall
115 Base top surface
116 Base bottom surface
118 Base inner cavity
120 Base inner channel
130 Base access hole
160 Gripping component
170 Tie-off hole
172 Tie-down hole
180 Rope guide notch
200 Tool aperture
210 Cover
212 Cover top surface
214 Cover side wall
218 Cover bottom
220 Cover slot
231 Cover first end
232 Cover second end Referring now to FIG. 1-6B, the present invention features a bucket stabilizing system cover (210) for covering a bucket stabilizing system. In some embodiments, the cover (210) comprises an annular cover top surface (212). In some embodiments, the cover (210) comprises a tapered cover side wall (214). In some embodiments, the cover (210) comprises a vertically straight, non-tapered cover side wall (214). In some embodiments, the cover (210) comprises an open cover bottom (218).

In some embodiments, at least one cover slot (220) is located in the cover side wall (214). In some embodiments, the cover (210) is alternately located over a base (110) covering a base access hole (130) and is removed to access the base access hole (130). In some embodiments, an inside of the cover side wall (214) interfaces with an outside of a base side wall (111). In some embodiments, alternately, the cover (210) is located having the annular cover top surface (212) placed on a horizontal surface having an interior cavity of the cover (210) used as a top tray or a bowl.

In some embodiments, the cover (210) comprises a tool aperture (200) located on the cover top surface (212).

In some embodiments, the cover (210) comprises a cover first end (231) that overlaps a cover second end (232) appearing to form a continuous cover (210) that can be pulled apart. In some embodiments, the bucket (101) is a cooler, an ice chest or an ice bucket.

In some embodiments, a bucket stabilizing system (100) (U.S. Pat. No. 8,534,632) for stabilizing a bucket and providing a covered storage space comprises a conical base (110) having an annular base top surface (115), a tapered base side wall (111), a planar base bottom surface (116), and a base inner cavity (118). In some embodiments, the base top surface (115) has a diameter smaller than that of the base bottom surface (118). In some embodiments, the base top surface (115) has a diameter equal to the base bottom surface (116). Buckets are well known to those of ordinary skill in the art. In some embodiments, the bucket (101) is a minnow bucket. In some embodiments, the bucket (101) is a tool bucket. In some embodiments, the bucket (101) is a paint bucket. In some embodiments, the bucket (101) is a utility bucket. In some embodiments, the bucket (101) is a mop bucket. In some embodiments, the bucket (101) is a cleaning bucket.

In some embodiments, the system (100) comprises a base inner channel (120) located in a center of the base (110) extending from the annular base top surface (115) toward the base bottom surface (116). In some embodiments, the base inner channel (120) is adapted to accept a bucket (101).

In some embodiments, the system (100) comprises at least one base access hole (130) located in the base side wall (111) for providing access to the base inner cavity (118). In some embodiments, the base inner cavity (118) is used for storage.

In some embodiments, the system (100) comprises a cover (210) having an annular cover top surface (212), a tapered cover side wall (214), and an open cover bottom (216). In some embodiments, at least one cover slot (220) is located in the cover side wall (214). In some embodiments, the cover slot (220) is open on one end and extends to an edge of the cover side wall (214). In some embodiments, the cover slot (220) is closed and does not extend to an edge of the cover side wall (214).

In some embodiments, the system (100) comprises a bucket (101) located through the base top surface (115) into the base inner channel (120). In some embodiments, a bucket floor rests on the base bottom surface (115).

In some embodiments, the cover (210) is alternately located over the base (110) covering the base access hole (130) and is removed to access the base access hole (130). In some embodiments, an inside of the cover side wall (214) interfaces with an outside of the base side wall (111). In some embodiments, the cover side wall (214) has the same slope and taper as the base side wall (111). In some embodiments, the cover side wall (214) and the base side wall (111) are both straight and not tapered.

In some embodiments, alternately, the cover (210) is located having the annular cover top surface (212) placed on a horizontal surface having an interior cavity of the cover (210) used as a top tray or a bowl.

In some embodiments, the system (100) comprises a gripping component (160) located on the base bottom surface (116) to help prevent the base (110) from slipping.

In some embodiments, the base access hole (130) is oval or round in shape.

In some embodiments, the base access hole (130) is rectangular in shape having rounded corners.

In some embodiments, a first rope guide notch (180) is located at an intersection of the base top surface (115) and the base inner channel (120), and a second rope guide notch (180) is located at an intersection of the base top surface (115) and the base inner channel (120) opposite the first rope guide notch (180). In some embodiments, the rope guide notches (180) allow passage of rope (102) into the base inner cavity (118).

In some embodiments, a first tie-off hole (170) is located at an intersection of the base top surface (115) and the base side wall (111), and a second tie-off hole (170) is located at an intersection of the base top surface (115) and the base side wall (111) opposite the first tie-off hole (170). In some embodiments, the tie-off holes (170) allow passage of rope (102) out of the base inner cavity (118).

In some embodiments, a first tie-down hole (172) is located in the base side wall (111) at or near the base bottom surface (116).

In some embodiments, the base bottom surface (116) is removably attached to the base side wall (111).

In some embodiments, a tool aperture (200) is located in the base top surface (115). In some embodiments, the tool aperture (200) is adapted to accept a tool handle. In some embodiments, the tool aperture (200) is adapted to accept a paint brush handle. In some embodiments, the tool aperture (200) is adapted to accept a shaft or a rod.

In some embodiments, this application is for a protective cover (210) for the bucket stabilizing tackle box system (100), U.S. Pat. No. 8,534,632 B1, which was originally designed without a cover (210) of any kind. The cover (210) must be constructed in a variety of shapes and designs in order to properly fit the variety of shapes and designs of the base (110). The cover (210) is to be considered an optional accessory for the base (110) previously described. The cover (210) can be inverted and installed upside down on top of the base (110) to provide a bowl or tray that will also hold supplies.

In some embodiments, the cover (210) is constructed in a continuous circle. In some embodiments, the cover (210) is not constructed in a continuous circle, but comprises a cover first end (231) and a cover second end (232). In some embodiments, the cover first end (231) overlaps the cover second end (232) of the cover (210) appearing to form a continuous circle. In some embodiments, the cover (210) having the cover first end (231) and the cover second end (232) that overlap is adapted to fit a base (110) without a top ridge or groove. In some embodiments, the cover (210) having the cover first end (231) and the cover second end (232) that overlap is adapted to fit a base (110) with a top ridge or groove.

In some embodiments, the cover top surface (212) comprises tool apertures (200) located thereon. In some embodiments, the tool apertures (200) on the cover top surface (212) align with the tool apertures (200) on the base top surface (115). In some embodiments, the cover (210) can be placed on the base (110) in a first manner where the tool apertures (200) on the cover top surface (212) align with the tool apertures (200) on the base top surface (115). In some embodiments, the cover (210) can be placed on the base (110) in a second manner, 180 degrees to the first manner, where the tool apertures (200) on the cover top surface (212) do not align with the tool apertures (200) on the base top surface (115), rather, the tool apertures (200) on the base top surface (115) are fully covered by the cover top surface (212) and the tool apertures (200) on the cover top surface (212) are fully blocked by the base top surface (115).

In some embodiments, a ledge is disposed on and around the base top surface (115). In some embodiments, the cover (210) fits around a ledge outer periphery facing either upward or downward.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc.

In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A tackle box system having a cover, the system comprising:
- a base (110) having a top surface (115) and a base inner channel (120);
- a bucket (101) having a bucket bottom end (104) and a bucket top end (103), the bucket bottom end (104) is disposed into the base inner channel (120); and
- a cover (210) comprising:
    - (i) an annular cover top surface (212);
    - (ii) a cover side wall (214) comprising a cover first end (231) and a cover second end (232), wherein the cover first end (231) overlaps the cover second end (232), wherein the cover side wall is tapered such that a top end of the cover (250) flares outwardly towards a bottom end of the cover (260); and
    - (iii) an open cover bottom (218);
- wherein the cover forming a tray is removably disposed around the bucket, as the cover is disposed in a first position where the cover top surface (212) of the cover directly interfaces with the top surface (115) of the base;
- wherein an inside (215) of the cover side wall (214) opens towards the bucket top end (103);
- wherein the top end of the cover (250) flares outwardly towards the bottom end of the cover (260) and also towards the bucket top end (103); and
- wherein the removable cover (210) that functions as the tray around the bucket (101) is reconfigurable to form a lid (210) for the base (110) when the cover (210) is removed from its tray position and flipped over to a second position to encapsulate the base (110) such that the inside (215) of the cover side wall (214) interfaces with an outside of a base side wall (111).

* * * * *